United States Patent
Hille et al.

(10) Patent No.: US 6,915,651 B2
(45) Date of Patent: Jul. 12, 2005

(54) HORIZONTAL ROTARY COMPRESSOR IN A BUS AIR CONDITIONER

(75) Inventors: Andreas Hille, Renningen (DE); Robert C. Reimann, LaFayette, NY (US); Belin Czechowicz, Dewitt, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/820,687

(22) Filed: Apr. 8, 2004

(65) Prior Publication Data

US 2004/0221599 A1 Nov. 11, 2004

Related U.S. Application Data

(63) Continuation-in-part of application No. 10/429,584, filed on May 5, 2003.

(51) Int. Cl.$^7$ .............................................. B60H 1/32
(52) U.S. Cl. ........................................ 62/244; 62/259.1
(58) Field of Search ................................ 62/244, 259.1, 62/263, 428, DIG. 16, 448; 454/100

(56) References Cited

U.S. PATENT DOCUMENTS

| | | | | |
|---|---|---|---|---|
| 3,848,428 A | * | 11/1974 | Rieter, Jr. ...................... | 62/285 |
| 3,984,224 A | * | 10/1976 | Dawkins ........................ | 62/89 |
| 4,043,143 A | * | 8/1977 | Fluder et al. .................. | 62/243 |
| 4,051,691 A | * | 10/1977 | Dawkins ........................ | 62/236 |
| 4,217,764 A | * | 8/1980 | Armbruster ................. | 62/323.1 |
| 4,641,502 A | * | 2/1987 | Aldrich et al. ................. | 62/244 |
| 4,679,616 A | * | 7/1987 | Ferdows et al. ............... | 165/43 |
| 4,727,728 A | * | 3/1988 | Brown .......................... | 62/244 |
| 5,184,474 A | * | 2/1993 | Ferdows ........................ | 62/244 |
| 5,211,027 A | * | 5/1993 | Lofting et al. ................. | 62/244 |
| 5,297,837 A | * | 3/1994 | Burst et al. ................... | 296/212 |
| 6,415,620 B1 | * | 7/2002 | Ferdows ........................ | 62/244 |

FOREIGN PATENT DOCUMENTS

| | | | |
|---|---|---|---|
| JP | 363270218 A | * | 11/1988 |
| JP | 02000043553 A | * | 2/2000 |

\* cited by examiner

Primary Examiner—William E. Tapolcai
Assistant Examiner—Mohammad M. Ali
(74) Attorney, Agent, or Firm—Wall Marjama & Bilinski LLP

(57) ABSTRACT

A bus air conditioning system with at least one air conditioning module installed on a bus roof. The air conditioning system having a pair of supply air openings for conducting the flow of conditioned air downwardly near the outer side of the roof and a return air opening whose position may vary substantially in the lateral direction from a longitudinal central axis of the bus for any given installation. The air conditioning system including a refrigeration circuit for circulating refrigerant serially through a compressor, a condenser coil, an expansion valve and an evaporator coil. The air conditioning system further including an evaporator section including an evaporator blower for causing return air to flow from said return air opening, into a return air compartment of the evaporator section, through the evaporator coil and then to the supply air opening. The air conditioning system further includes a condenser fan for causing outside air to flow over the condenser coil and then to be discharged outside. Where the compressor is a horizontal compressor with a longitudinal axis. The compressor is mounted proximate to the roof of the bus and external to the passenger compartment of the bus and the compressor oriented such that the longitudinal axis of the compressor is substantially perpendicular to the longitudinal axis of the bus.

13 Claims, 9 Drawing Sheets

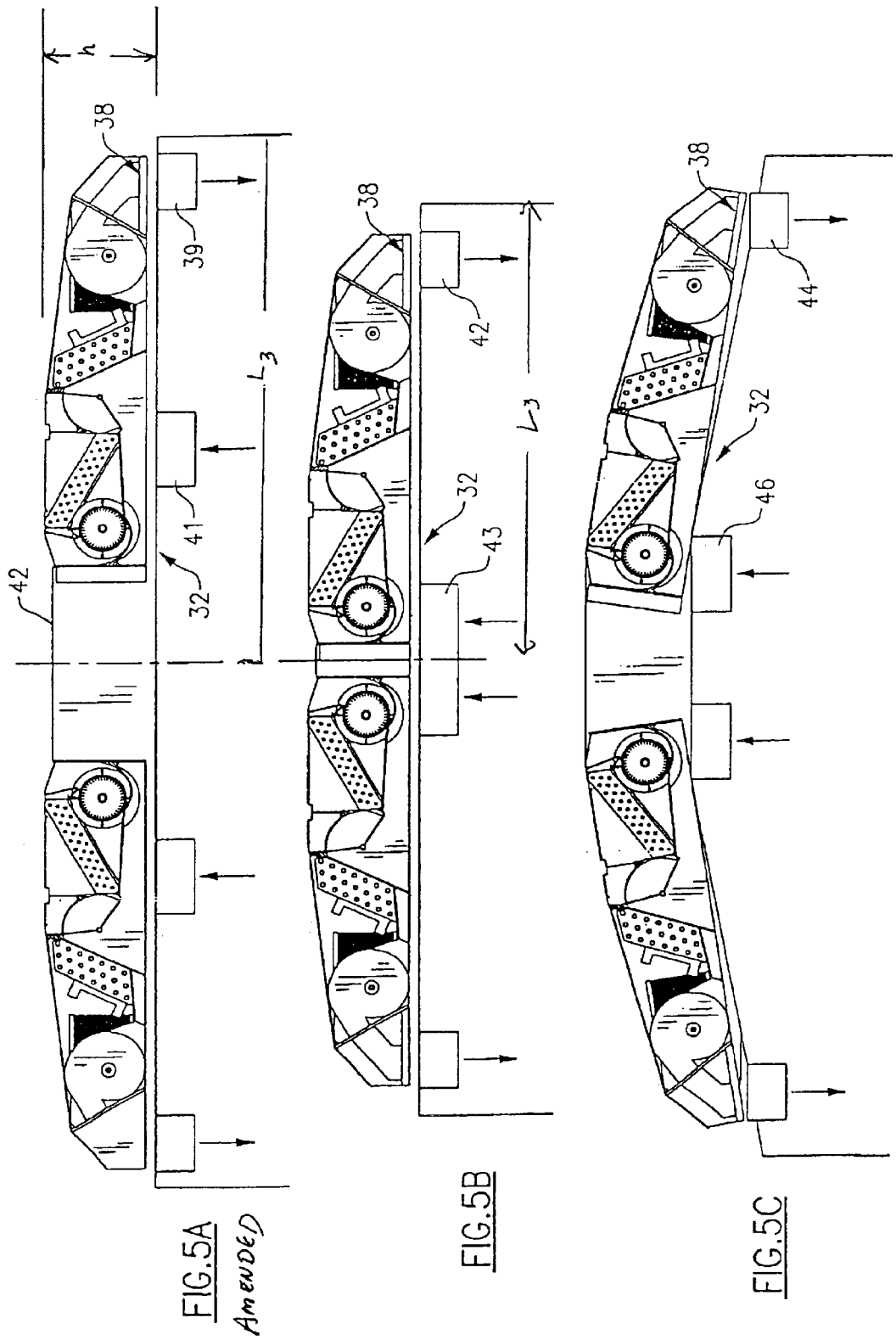
FIG.5A
Amended
FIG.5B
FIG.5C

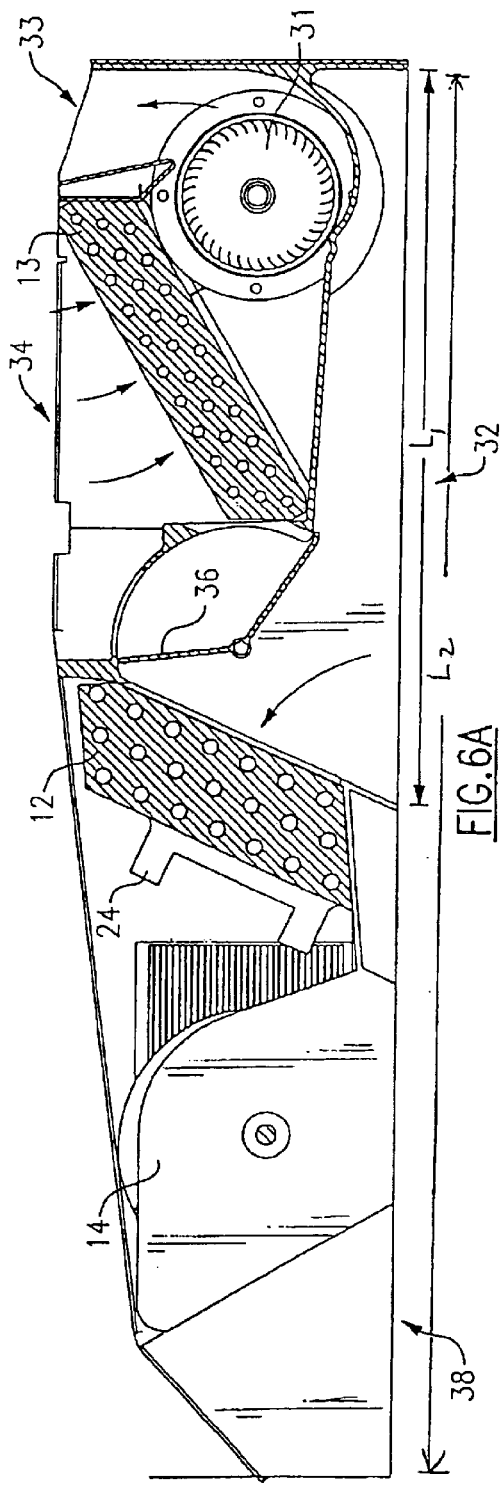
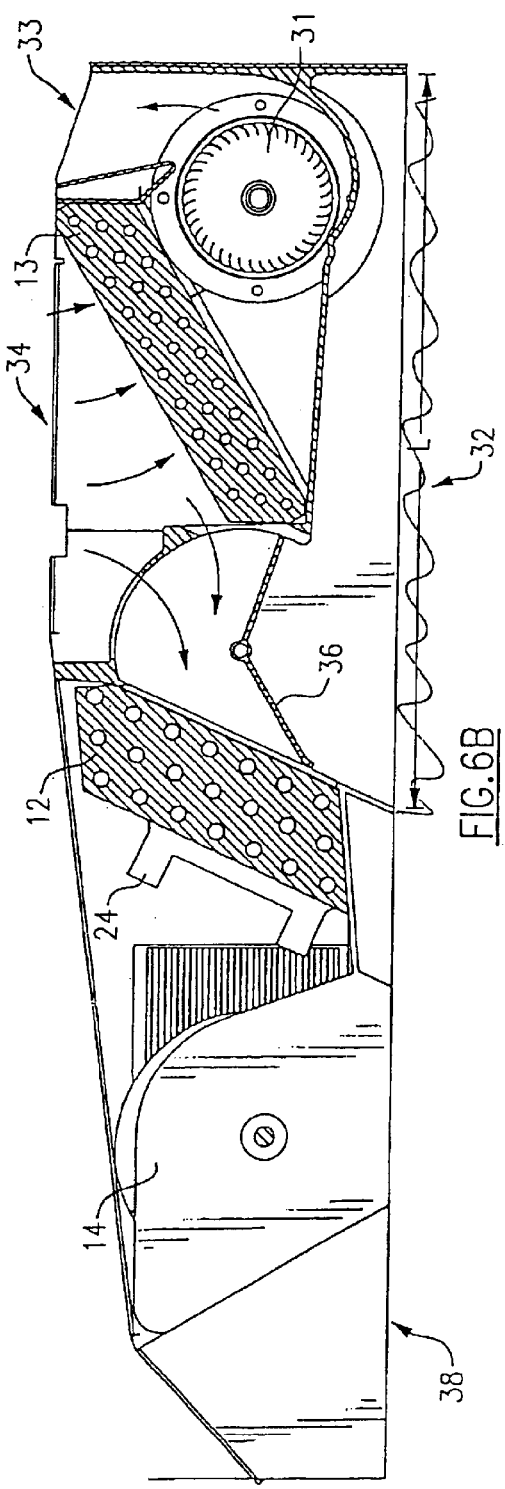
FIG.6A
FIG.6B

HORIZONTAL ROTARY COMPRESSOR IN A BUS AIR CONDITIONER

CROSS REFERENCE TO RELATED APPLICATIONS

This application is a continuation-in-part application and claims the benefit of priority under 35 U.S.C. §120 of U.S. patent application Ser. No. 10/429,584 entitled "Modular Rooftop Air Conditioner for a Bus", filed on May 5, 2003, which is incorporated herein by reference in its entirety.

This application claims the benefit of priority under 35 U.S.C. §120 of U.S. patent application Ser. No. 10/429,481 entitled "Modular Bus Air Conditioning System", filed on May 5, 2003, which is incorporated herein by reference in its entirety.

This application claims the benefit of priority under 35 U.S.C. §120 of U.S. patent application Ser. No. 10/429,456 entitled "Supply Air Blower Design in Bus Air Conditioning Units", filed on May 5, 2003, which is incorporated herein by reference in its entirety.

This application claims the benefit of priority under 35 U.S.C. §120 of U.S. patent application Ser. No. 10/429,453 entitled "Bus Rooftop Condenser Fan", filed on May 5, 2003, which is incorporated herein by reference in its entirety.

This application claims the benefit of priority under 35 U.S.C. §120 of U.S. patent application Ser. No. 10/429,455 entitled "Method and Apparatus for Refreshing Air in a Bustop Air Conditioner", filed on May 5, 2003, which is incorporated herein by reference in its entirety.

This application claims the benefit of priority under 35 U.S.C. §120 of U.S. patent application Ser. No. 10/429,454 entitled "Coil Housing Design for a Bus Air Conditioning Unit", filed on May 5, 2003, which is incorporated herein by reference in its entirety.

This application claims the benefit of priority under 35 U.S.C. §120 of U.S. patent application Ser. No. 10/430,092 entitled "Integrated Air Conditioning Module for a Bus", filed on May 6, 2003, which is incorporated herein by reference in its entirety.

This application claims the benefit of priority under 35 U.S.C. §120 of U.S. patent application Ser. No. 10/429,451 entitled "Fresh Air Intake Filter and Multi Function Grill", filed on May 5, 2003, which is incorporated herein by reference in its entirety.

This application claims the benefit of priority under 35 U.S.C. §120 of U.S. patent application Ser. No. 10/429,583 entitled "Integrated Air Conditioning Module for a Bus", filed on May 5, 2003, which is incorporated herein by reference in its entirety.

This application claims the benefit of priority under 35 U.S.C. §120 of U.S. patent application Ser. No. 10/429,424 entitled "Modular Air Conditioner for a Bus", filed on May 5, 2003, which is incorporated herein by reference in its entirety.

This application claims the benefit of priority under 35 U.S.C. §120 of U.S. patent application Ser. No. 10/429,437 entitled "Modular Air Conditioner for a Bus Rooftop", filed on May 5, 2003, which is incorporated herein by reference in its entirety.

This application claims the benefit of priority under 35 U.S.C. §120 of U.S. patent application Ser. No. 10/429,423 entitled "Evaporator Section for a Modular Bus Air Conditioner", filed on May 5, 2003, which is incorporated herein by reference in its entirety.

This application claims the benefit of priority under 35 U.S.C. §120 of U.S. patent application Ser. No. 10/429,484 entitled "Wide Evaporator section for a Modular Bus Air", filed on May 5, 2003, which is incorporated herein by reference in its entirety.

This application claims the benefit of priority under 35 U.S.C. §120 of U.S. patent application Ser. No. 10/429,391 entitled "Condensate Pump for Rooftop Air Conditioning Unit", filed on May 5, 2003, which is incorporated herein by reference in its entirety.

This application claims the benefit of priority under 35 U.S.C. §120 of U.S. patent application Ser. No. 10/429,452 entitled "Condensate Removal System Rooftop Air Conditioning", filed on May 5, 2003, which is incorporated herein by reference in its entirety.

This application claims the benefit of priority under 35 U.S.C. §120 of U.S. patent application Ser. No. 10/429,390 entitled "Modular Rooftop Unit Supply Air Ducting Arrangement", filed on May 5, 2003, which is incorporated herein by reference in its entirety.

This application claims the benefit of priority under 35 U.S.C. §120 of U.S. patent application Ser. No. 10/429,389 entitled "Configuration for Modular Bus Rooftop Air Conditioning System", filed on May 5, 2003, which is incorporated herein by reference in its entirety.

This application claims the benefit of priority under 35 U.S.C. §120 of U.S. patent application Ser. No. 10/429,388 entitled "Unibody Modular Bus Air Conditioner", filed on May 5, 2003, which is incorporated herein by reference in its entirety.

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

Also associated with the existing bus air conditioning systems is the problem of a component failure causing a complete loss of the air conditioning capacity. That is, with a single large unit as is now customary, failure of that unit such as, for example, a leaking hose causing loss of refrigerant, an electrical failure leading to inoperation of one of the components such as a fan, or a compressor failure, the entire unit is inoperable and no air conditioning can be provided to the unit. In such a situation, it would preferable if partial capacity could be maintained in order to provide a "limp home" capability.

In addition to the function of cooling the air in a passenger compartment of a bus, it is also necessary to warm the air when the ambient conditions are cold Again, it is common to use the energy that is available at the drive engine, with the heat coming from the engine coolant. But, similar to the case of cooling, less heat will be available when the engine is idling, for example.

Generally speaking, the capacity of a compressor is typically proportional to the diameter of the compressor. Similarly, the cost effectiveness of a compressor is related to the aspect ratio of the compressor, thus from am cost effectiveness standpoint, it is undesirable to have long skinny compressors. Therefore, typical hermitic, high volume and low cost compressors are only manufactured in discrete aspect ratios.

A proposed approach, involves locating the air conditioning system for a bus on the roof of the bus. Locating the air conditioning system to the roof of the bus requires that, when installed, the air conditioning system does not cause the height of the bus to exceed operational limits that would cause the bus to strike overhead objects, such as, for example, signs, bridges and overpasses when passing underneath. In addition, bus manufacturers prefer for styling and aesthetic reasons that the air conditioning units protrude above the roofline as little as possible. Likewise, for a cost effective system, the aspect ratio of the compressor must fall within a certain range. For example, for a given diameter and compressor efficiency, the length of the compressor typically will fall within a small range of lengths.

It is therefore an object of the present invention to provide an improved bus top air conditioning system Another object of the present invention is the provision for a bus air conditioning system which is effective at all operating speeds of the bus, while at the same time does not require an oversized compressor.

Yet another object of the present invention is the provision for reducing the manufacturing, installation, and maintenance costs of a bus air conditioning system.

Still another object of the present invention is that of providing an air conditioning system that is designed for adaptability of use in various types of installation configurations.

Another object of the present invention is that of providing a "limp home" capability in the event of certain component failures.

Still another object of the present invention is the provision in a rooftop air conditioning system for effectively providing heat to the passenger compartment, regardless of engine speed.

Yet another object of the present invention is the provision for a bus rooftop air conditioning system which is economical to manufacture and effective in use.

Yet another object of the present invention is the provision of a low profile rooftop air conditioning system.

Yet another object of the present invention is the provision of an aesthetically pleasing rooftop air conditioning system.

Yet another object of the present invention is the provision of a lower drag rooftop air conditioning system.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, rather than a large single air conditioning unit, a plurality of relatively small identical modules can be installed on the roof of a bus, with each being capable of operating independently of the others so as to allow for the relatively low cost mass production of identical standardized units and also provide for a limp home capability in the event of failure of one or more units.

By yet another aspect of the invention, the modules may include a compressor, such that all the necessary refrigerant piping is located entirely on the module, with electrical power being provided to the electrical components on the module from a motor driven generator.

By another aspect of the invention, the evaporator section of the air conditioning unit has a relatively wide return air openings so as to be adaptable to use with any of the narrow body, wide body or curved top buses.

By still another aspect of the invention, heat is introduced into the air conditioning system by way of a heat resistance coil located in the air stream passing to the passenger compartment of the bus.

By still another aspect of the invention, there is provided a bus air conditioning system with at least one air conditioning module installed on a bus roof The air conditioning system having a pair of supply air openings for conducting the flow of conditioned air downwardly near the outer side of the roof and a return air opening whose position may vary substantially in the lateral direction from a longitudinal central axis of the bus for any given installation. The air conditioning system includes a refrigeration circuit for circulating refrigerant serially through a compressor, a condenser coil, an expansion valve and an evaporator coil. The air conditioning system further includes an evaporator section including an evaporator blower for causing return air to flow from said return air opening, into a return air compartment of the evaporator section, through the evaporator coil and then to the supply air opening. The air conditioning system further includes a condenser fan for causing outside air to flow over the condenser coil and then to be discharged outside. The compressor is a horizontal compressor with a longitudinal axis. The compressor is mounted proximate to the roof of the bus and external to the passenger compartment of the bus and the compressor oriented such that the longitudinal axis of the compressor is substantially perpendicular to the longitudinal axis of the bus.

In the drawings as hereinafter described, a preferred embodiment is depicted; however, various other modifications and alternate constructions can be made thereto without departing from the true sprit and scope of the invention.

BRIEF DESCRIPTION OF THE DRAWINGS

FIGS. 5A–5C are sectional views of modules as applied to various types of bus installations in accordance with a preferred embodiment of the invention.

FIGS. 6A–6C are sectional views of a module with an air mixing stops in various positions.

DESCRIPTION OF THE PREFERRED EMBODIMENT

Figure 1:
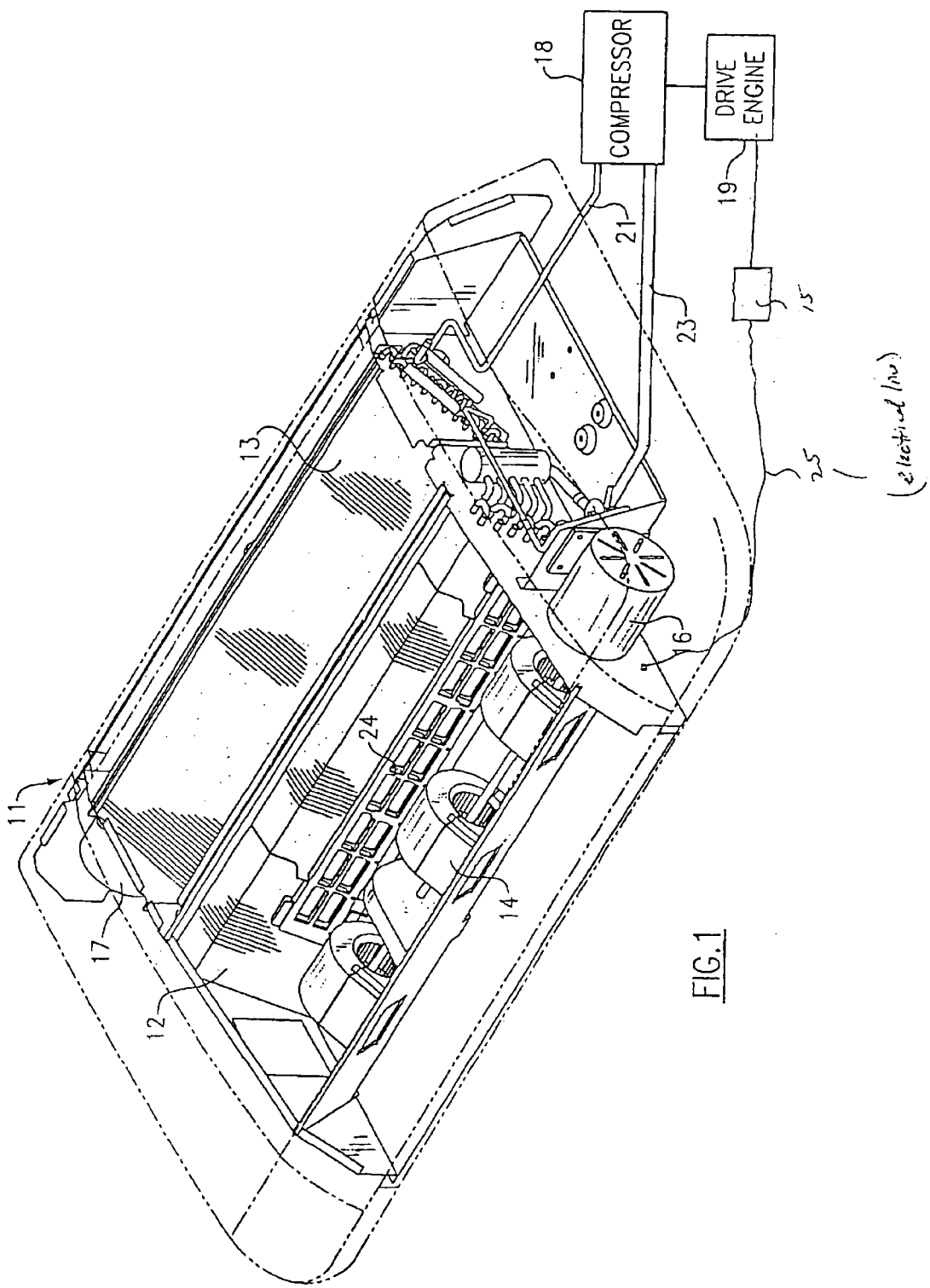
FIG. 1 is a perspective view of a module in accordance with a preferred embodiment of the invention.
Figure 3:
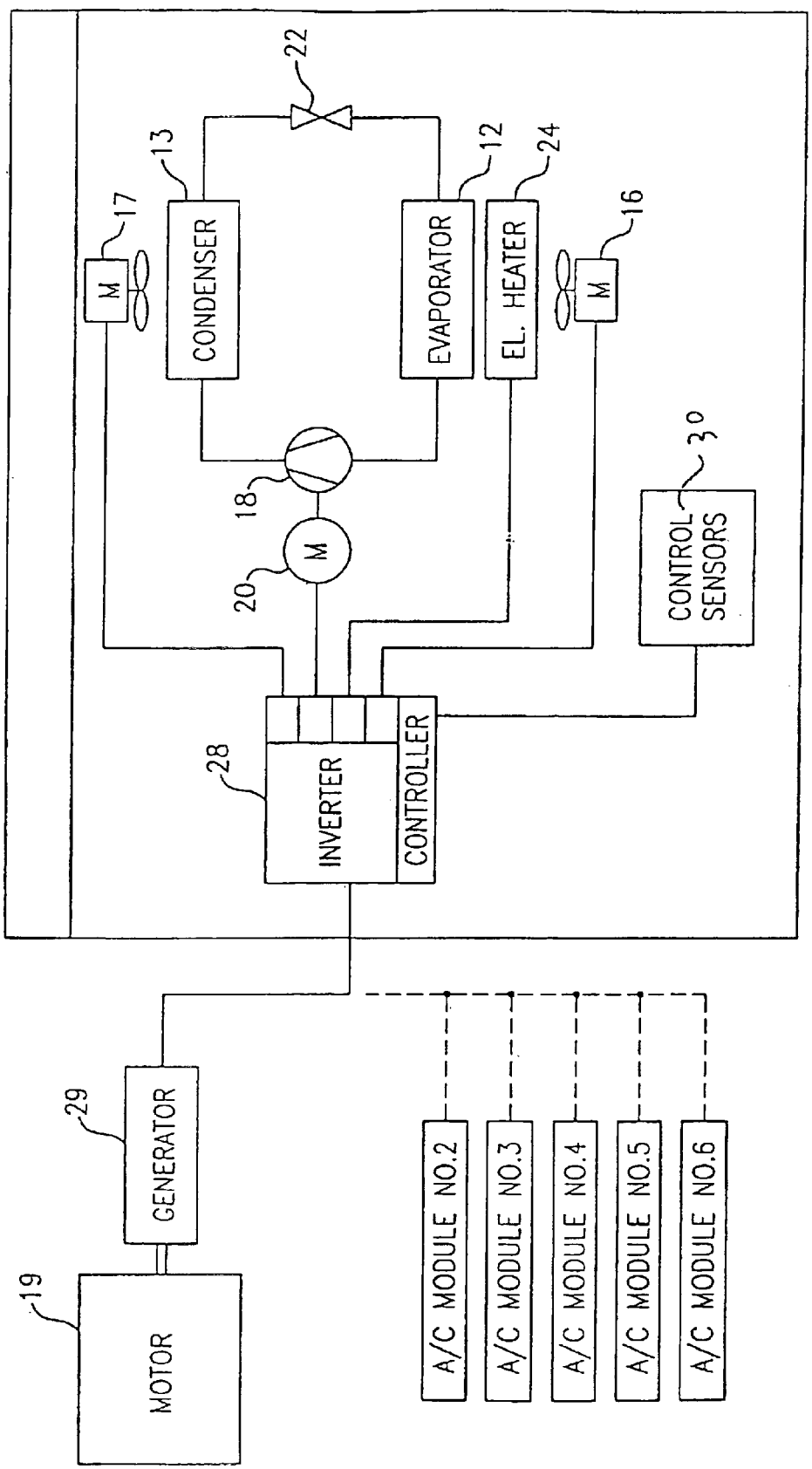
FIG. 3 is a schematic illustration of both a refrigeration circuit and an electrical circuit within a module in accordance with the present invention.

FIG. 1 shows a module 11 with the cover removed to show the various components including an evaporator coil 12, a condenser coil 13, a plurality of evaporator blowers 14 and associated drive motors 16, and a condenser fan motor 17 for driving a condenser fan (see FIG. 3).

Outside the module 11 is a compressor 18 which is driven by a motor drive 19 to pump refrigerant from the compressor 18 through refrigerant line 21 to the condenser coil 13 and eventually to the evaporator coil 12 by way of an expansion valve 22 (see FIG. 3). The refrigerant vapor then passes back to the compressor 18 by way of refrigerant line 23.

The drive engine 19 is also operatively connected to an electrical generator 15, (or alternator, if desired) for providing electrical power to the module by way of line 25.

Also shown in FIG. 1 is an electrical resistance heater 24 which is downstream of the evaporator coil 12 such that, for periods of heating, the air is drawn by the evaporator blower 14 through the evaporator coil 12 and the heater 24 such that the air being delivered to the passenger compartment of the bus is heated The electrical power to the heater 24, as well as to the evaporator blower motor 16 and the condenser fan motor 17, is provided by way of the electrical line 25 receiving DC power from the generator 15. The heater 24 can be powered by either DC or AC currents with the heat output being independent of the speed of the drive engine 19. With the module as shown in FIG. 1, DC power is available to power all of the motor components and is therefore preferred for the heater 24.

Figure 2:
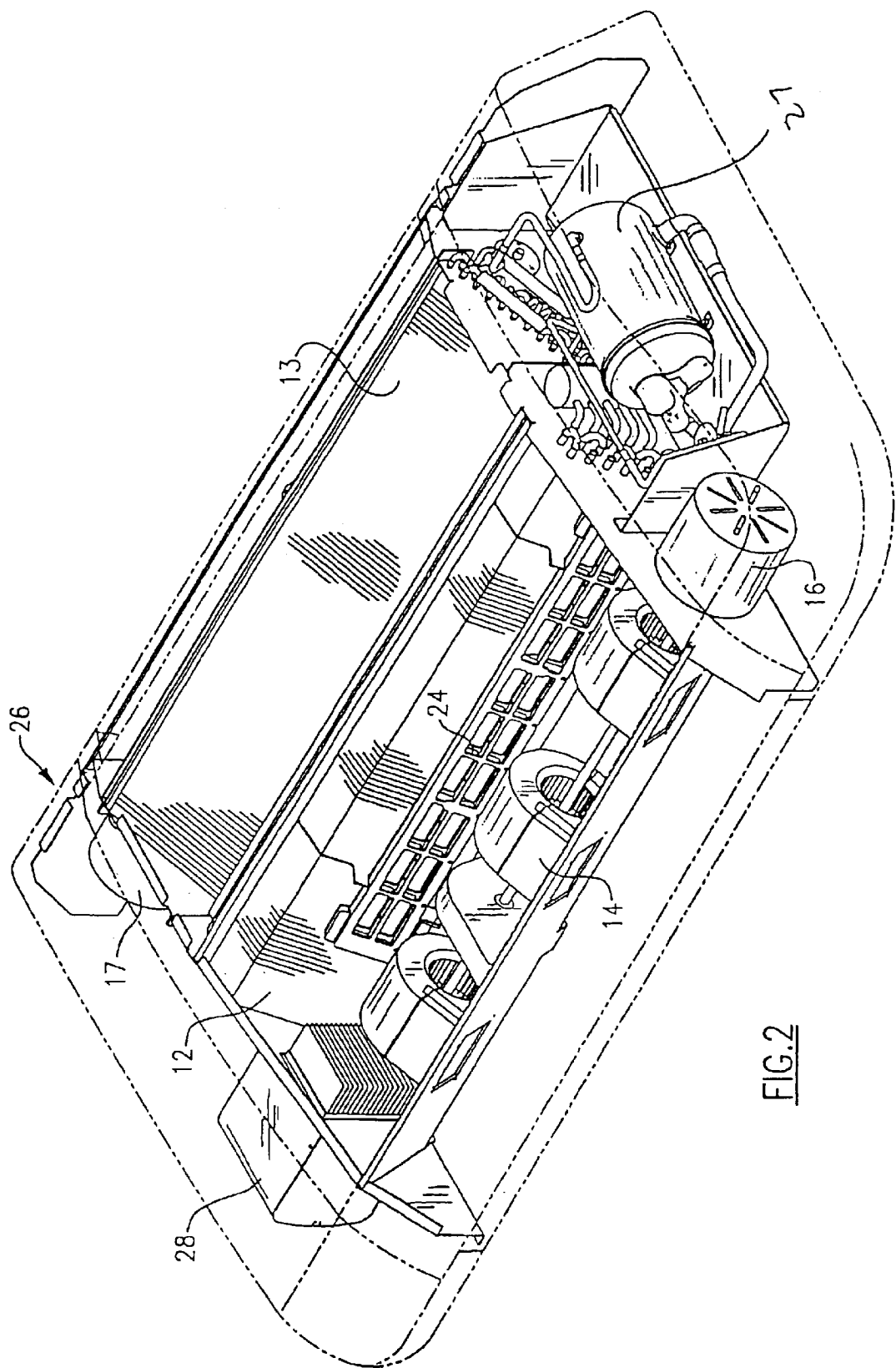
FIG. 2 is an alternative embodiment of the invention to include a compressor.

Referring now to FIG. 2, a modified module 26 is shown to include all of the components as described hereinabove.

Further, it includes a horizontal rotary compressor 27 which is operatively interconnected between the evaporator coil 12 and the condenser coil 13 so as to circulate refrigerant in a manner similar as described hereinabove. The difference over the earlier described system, however, is that the hermetic compressor 18 is driven by an internal electric motor 20, with the power being provided by way of the generator 29, driven by the main engine 19, and an inverter/controller 28 as shown in FIG. 3. The inverter/controller 28, which receives input from various control sensors 30 and which includes a rectifier and an inverter, receives AC power from a generator or alternator 29 and provides, by way of the inverter, controlled AC power to the evaporator blower motor 16, the condenser blower motor 17, the compressor drive motor 20 and the heater 24. Since the invertor/controller 28 is capable of providing controlled AC power, each of the motors are AC motors, thereby ensuring a more maintenance free system.

With the inverter/controller providing controlled AC power, a preferred type of heat 24 is a positive temperature coefficient (PIC) heater wherein electrical resistance increases relatively fast as the temperature increases. Whereas this type of heater is relatively expensive in it initial installation, it acts as a self limiter and does not require a thermostat to maintain a safe temperature limit.

In one embodiment of the module 26 shown in FIG. 2 the constituent components of the module are arranged so that when the module 26 is installed on a bus, the horizontal rotary compressor 27 is oriented such that its longitudinal axis 27c is substantially perpendicular to the longitudinal axis of the bus. An example of a horizontal rotary compressor is provided U.S. Pat. No. 5,221,191, entitled "Horizontal Rotary Compressor", assigned to the Assignee of the present application, which is herein incorporated by reference in its entirety. If horizontal compressor 27 is installed such that its longitudinal axis 27c is substantially parallel to the longitudinal axis of the bus, then when the bus pitches, i.e., goes up or down hills or grades, the lubricant in the compressor 27 will tend to collect at the lower most end of the compressor as used herein, the term "longitudinal axis of the bus" is intended to mean an axis extending from the front to the rear of the bus in the direction in which the bus travels when it is traveling in a straight forward or rearward direction. When the lubricant in the compressor 27 collects at one end of the compressor 27, lubrication of the compressor 27 may become interrupted If the bus remains in a pitched attitude for frequent or prolonged periods, the compressor may become damaged due to the lack of lubrication. Configuring the module 26, such that when installed the compressor 27 is in a transverse relationship to the longitudinal axis of the bus ensures that inclination of the bus from its normal operating position, such as, for example when it is climbing or descending a hill, the compressor 27 will not cause a lack of lubrication in the compressor 27. The inventors have discovered that by mounting the horizontal rotary compressor 27 in a transverse relationship to the longitudinal axis of the bus that the bus can negotiate ascending and descending grades in excess of 20 degrees without an interruption in the lubrication of the compressor 27.

It will be appreciated by those of ordinary skill in the art of providing conditioning for the passenger compartments of large passenger vehicles that although the module 26 has been described with reference to a horizontal rotary compressor 27, in view of the teachings of the instant application, that other types of compressors may be adapted for operation in a horizontal mode and may therefore be used in the air conditioning system of the present invention, such as, for example, rotary vaned compressors or scroll compressors.

Due to the clearance requirements for passing under signs, bridges and the like the overall height of a bus is restricted. Because the module 26 increases the height of the bus when mounted on or about the roof, the height of the module 26 must be carefully controlled to ensure that bus's height restrictions are not exceeded. The inventors have discovered that by configuring the module 26 such that when installed, less than 200 mm of the module 26 extends above the roof line of the bus that the module 26 may be mounted to almost every commercially available bus without exceeding any overall height restrictions. Additionally, the inventors have found that a roof mounted module that extends less than about 200 mm does not unnecessarily detract from the aesthetics or aerodynamic efficiency of the vehicle. When using compressors of about 200 mm in diameter or less, the inventors have discovered that it is advantageous to construct the bus air conditioning system in a modular fashion with a number of compressor modules. Using a modular configuration allows the installed compressors to have a low profile while meeting important operation efficiency and capacity requirements.

Figure 4:
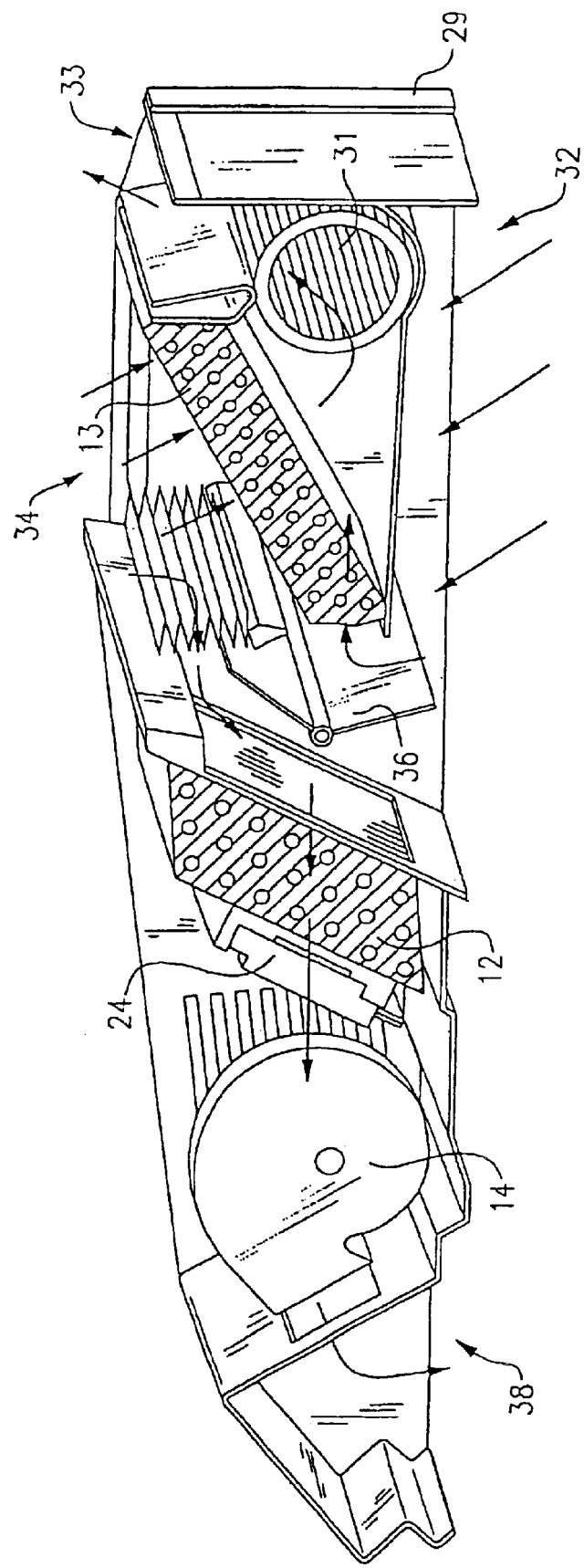
FIG. 4 is a cut away perspective view of a module in accordance with a preferred embodiment of the invention.

Referring now to FIG. 4, the module is shown with the various components as described hereinabove enclosed within a housing 29 and including a condenser fan 31. Also shown are the various openings in the housing 29, including a return air opening 32, a condenser outlet opening 33 and a condenser/fresh air intake opening 34. A fresh/return/exhaust air flap 36 is provided between the condenser coil 13 and the evaporator coil 12 to control the mix of air passing to the evaporator coil 12, depending on the particular demands of the system, as well as the existing ambient conditions. The air flow pattern, as indicated by the arrows, is thus controlled by the condenser fan 31, the evaporator fan 14 and the position of the air flap 36. As the return air enters the return air opening 32, it is caused to flow out the condenser outlet air opening and/or through the evaporator coil 12 depending on the position of the air flap 36. Similarly, the fresh air coming in the intake opening 34 passes through the condenser coil 13 and then out the condenser outlet air opening 33 and/or, depending on the position of the air flap 36, it is allowed to pass through the evaporator coil 12. Thus, with the use of the air flap 36 it is possible to have all of the return air pass through the condenser air outlet opening 33, with all fresh air passing into the air intake opening 34 and then through the evaporator coil 12, or when the flap 36 is placed in the other extreme position, all of the return air passes through the evaporator coil 12 and all of the fresh air entering the air intake opening 34 passes through the condenser coil 13 and out the condenser outlet air opening 33. A more likely operating condition, however, is an intermediate position of the air flap 36 wherein a selective mix of return air and fresh air are passed through the evaporator coil 12.

As will be seen, a filter 37 is positioned in the air flow stream which enters the fresh air intake opening 34 and passes through the evaporator coil 12. Its purposes is to filter out any debris that may be in the air stream entering the air intake opening 34. After passing through the evaporator coil 12, the conditioned air is caused to flow by the evaporator blower 14 out a supply air opening 38 as shown.

Considering now the manner in which the module 11 is positioned on the rooftop in such a way as to meet the minimum height requirements and interface with the existing air path openings on the rooftop, reference is made to FIGS. 5a–5c. Firstly, there is a requirement that the height, h, above the rooftop of the bus not exceed 200 mm. Secondly, let us consider the various positions in which the return air duct may be located. As will be seen, the position of the various openings on a bus can vary substantially from application to application. For example, in a wide bus application as shown in FIG. 5a, the supply air duct 39 is located near the outer side of the bus, whereas the return air duct 41 is disposed at a substantial distance from the longitudinal center line thereof. In a narrow bus application as shown in FIG. 5b, the supply air duct 42 is moved a small distance inwardly from the outer side of the bus, and the return air duct is located adjacent the longitudinal centerline as shown. In a curved-roof bus as shown in FIG. 5c, the supply air duct 44 is moved slightly more inwardly from the outer side of the bus, and the return air duct 46 is located in an intermediate position, somewhat outwardly of the longitudinal centerline, but not as far as for a wide bus application.

Of course, in all of the bus applications, a balanced arrangement is provided wherein each side of the bus is provided with both a supply air duct and a return air duct, in a substantially mirror image arrangement as shown. Thus, the modules are placed in back-to-back relationship, with the space therebetween being varied to accommodate the individual application requirements. For example, for the wide bus application of FIG. 5a, there is a substantial space between the two modules wherein for the narrow bus application of FIG. 5b, they are substantially in an abutting relationship. For the curved roofbus application, they are somewhat angled from a true horizontal position, with the spacing therebetween being at an intermediate degree as shown. It should be understood that the three types of installations shown are presented as a sampling of the possible installation requirements, and there are also others that have heretofore required unique designs in order to meet the particular requirements. The present design, on the other hand, provides a single module which will meet the needs of all of the various applications of rooftop air conditioners.

As will be seen, the supply air opening is relatively small, and in each of the three cases described above, the module 11 is placed in such a position that the supply air opening 38 is located substantially over the individual supply air ducts 39, 42 and 44. The return air opening 32, on the other hand is relatively large and therefore can accommodate the various positions of the return air ducts 41, 43 and 46 as shown.

Figure 6C:
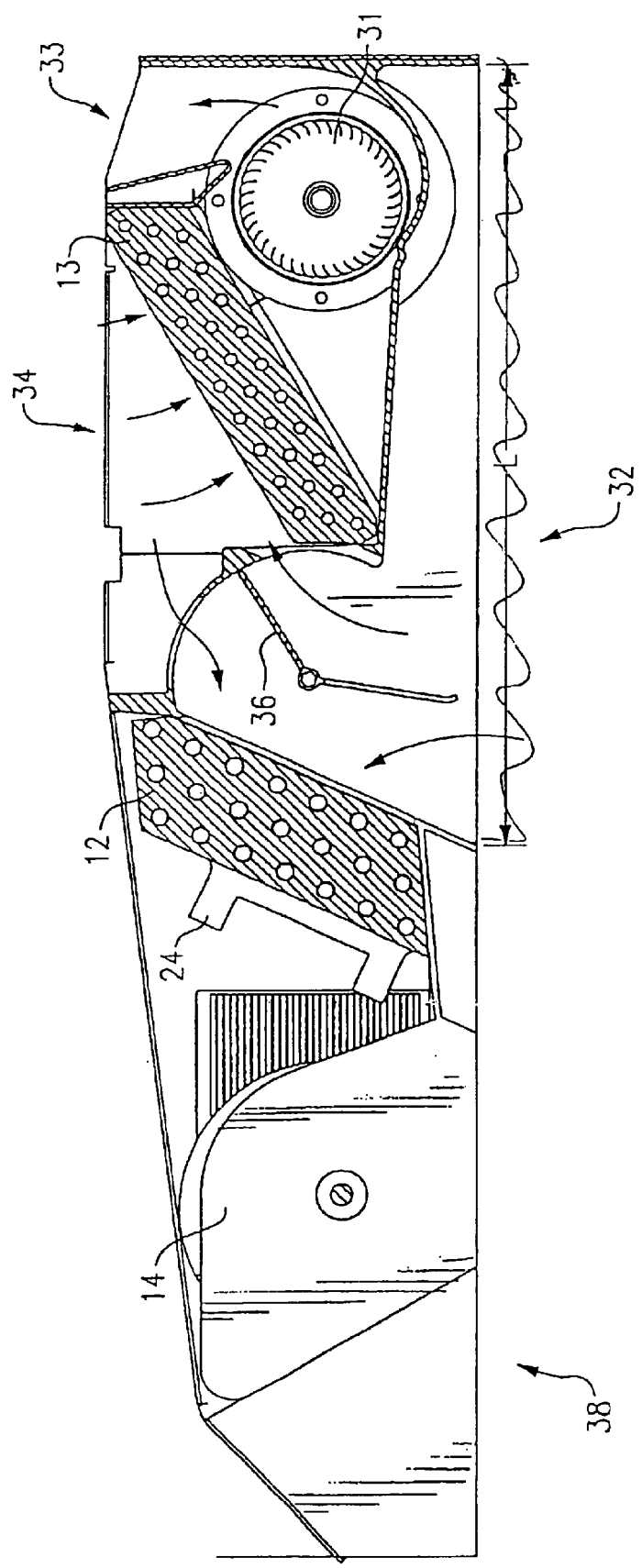

In order to describe the length (i.e., the extent that it spans a lateral dimension of the bus), of the return air opening 32, it is necessary to briefly review the design features, including the exhaust air flap 36 as shown in FIGS. 6a–6c. In FIG. 6a, the fresh/return/exhaust air flap 36 is placed in such a position that all of the return air coming into the return air opening 32 passes through the evaporator coil 12 as shown, and with all of the fresh air entering the fresh air intake opening 34 passing through the condenser coil 13 and out the outlet air opening 33. In FIG. 6b, the fresh/return/exhaust air flap 36 is placed in the other extreme position wherein none of the return air passing into the return air opening 32 is passed to the evaporator coil 12 and the only air entering the evaporator coil 12 is the fresh air, a portion of which passes through the evaporator coil 12 and a portion of which passes through the condenser coil 13 as shown. In FIG. 6c, the fresh/return/exhaust air flap 36 is placed in an intermediate position wherein a portion of the return air passes through the evaporator coil 12, and a portion thereof is diverted to pass through the condenser coil 13. In this case, fresh air is also diverted from the air intake opening 34 and mixed with the return air as it passes through the evaporator coil 12.

In all of the three positions of the fresh/return/exhaust air flap 36 as shown, and for any other position thereof, the return air opening 32 of the module is rather extensive in length, with the length thereof being represented by the designation $L_1$. It is because of this substantial length $L_1$, of the return air opening 32 that the module 11 can accommodate the various installation requirements as described hereinabove.

The relative size of $L_1$, can be established by a convenient comparison with the overall length $L_2$ of the module. That is the ratio of longitudinal length $L_1$, of the opening to the longitudinal length $L_2$ of the module is $$\frac{18.64 \text{ inches}}{37.80 \text{ inches}} = .493$$

It is therefore greater than 45% and close to 50%. Another reference point is the width of the bus rooftop or more appropriately, the half width of a bus. A wide bus has a half width of approximately 51 inches and a narrow bus has a half width of approximately 48 inches. Thus, for a wide bus (FIG. 5a), the ratio of the length $L_1$ to the bus half width $L_3$ (i.e. the dimension between a longitudinal centerline thereof and the outer side of the bus) is:

$$\frac{18.64 \text{ inches}}{51 \text{ inches}} = .365$$

For a narrow bus (FIG. 5b) it is:

$$\frac{18.64 \text{ inches}}{48 \text{ inches}} = .388$$

In each case, it is therefore greater than 36%.

Figure 7:
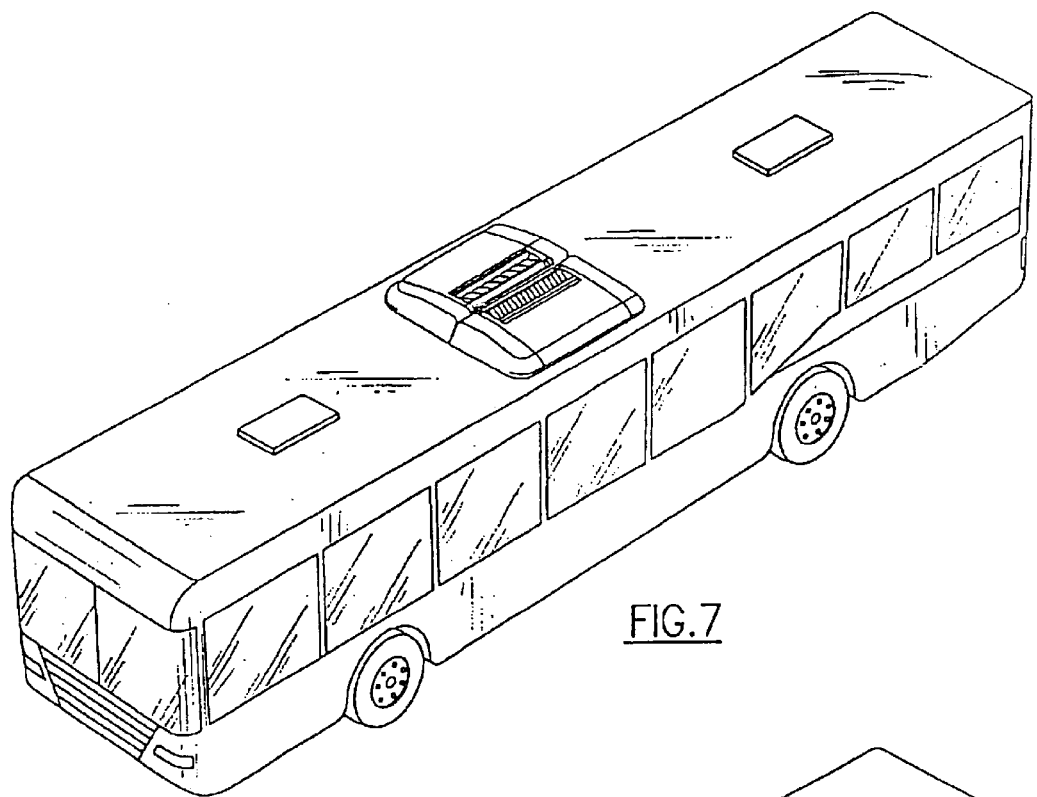
FIG. 7 is a perspective view with a pair of modules installed in accordance with a preferred embodiment of the invention.
Figure 8:
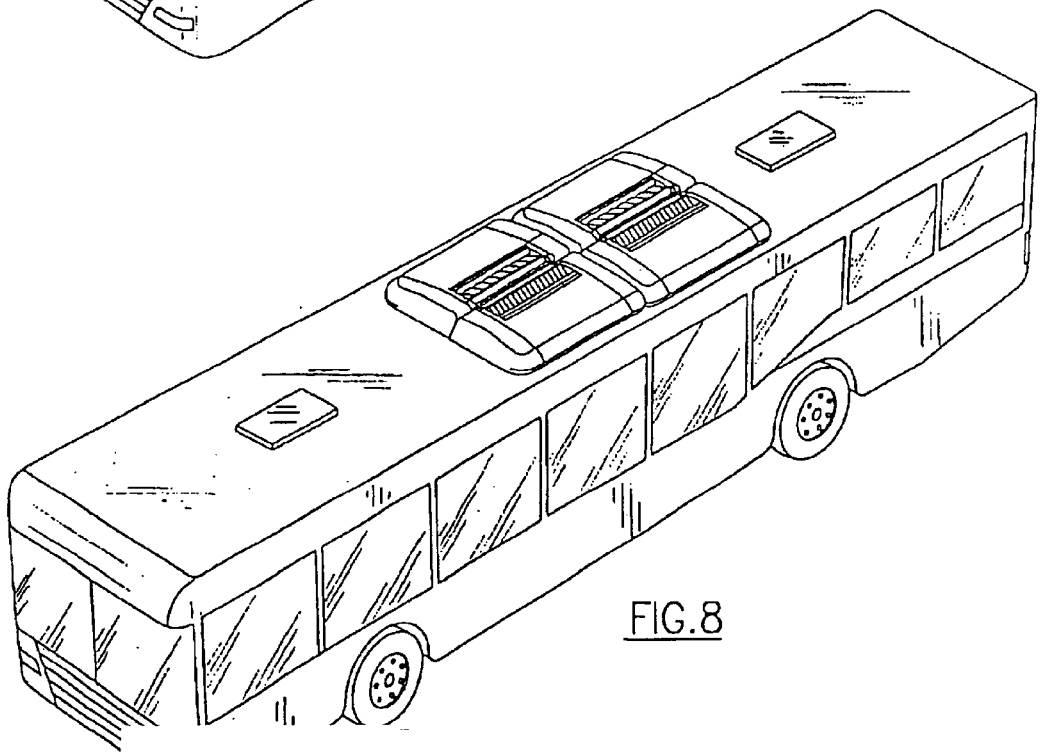
FIG. 8 shows a perspective view of four modules installed in accordance with the invention.
Figure 9:
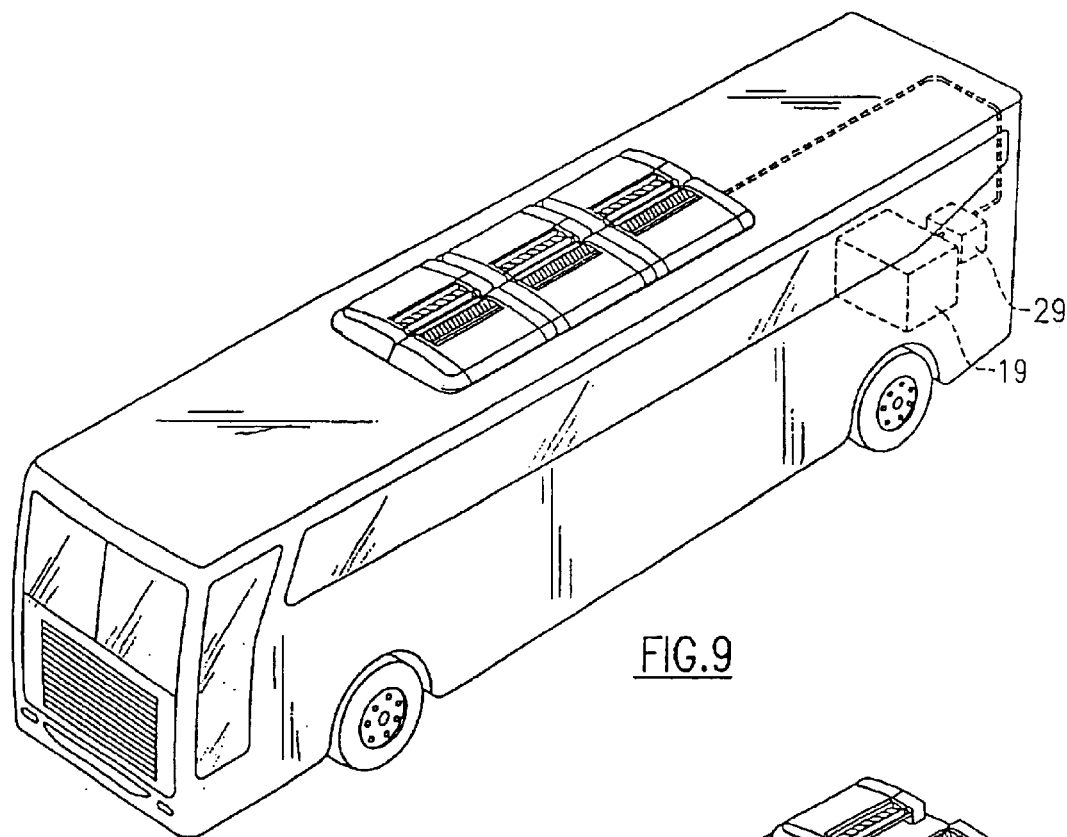
FIG. 9 is a perspective view of six modules installed in a bus in accordance with the invention.
Figure 10:
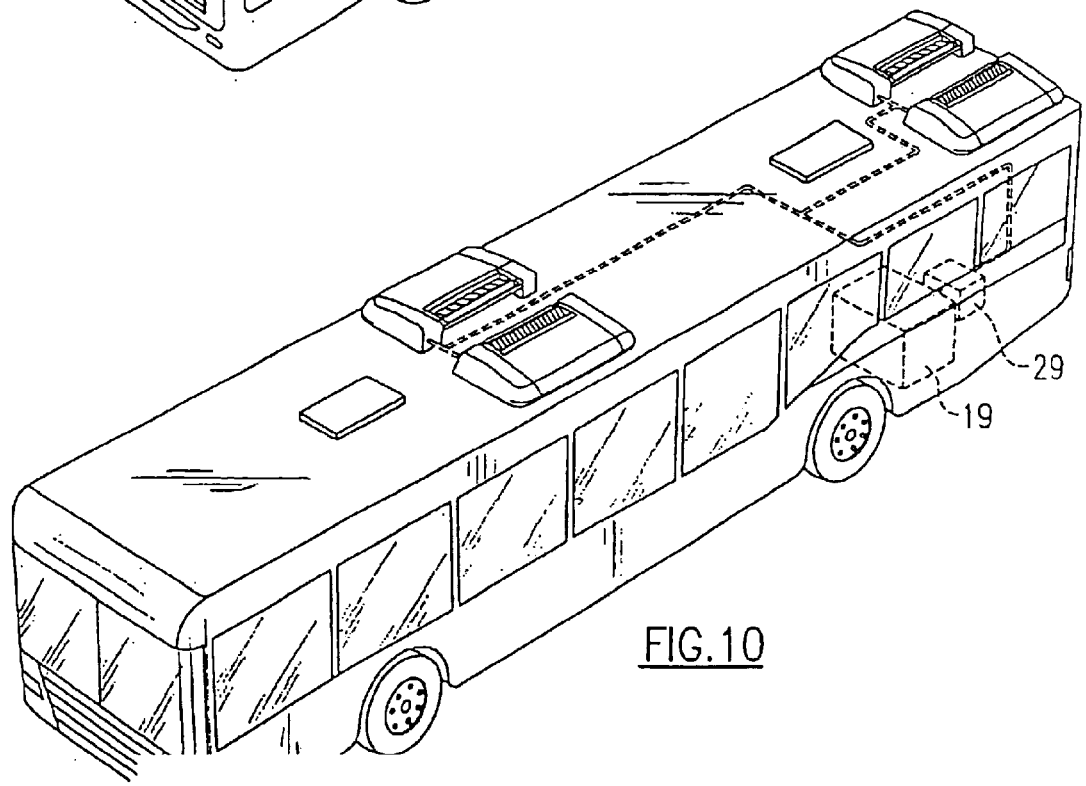
FIG. 10 is a perspective view of an alternative installation of four modules on a bus rooftop.

In FIGS. 7–10, there is shown various pairings of modules as installed on various locations of the bus rooftop. In FIG. 7, a pair of modules are positioned in back-to-back relationship near the longitudinal center of the bus. In FIG. 8, there are two such pairings (i.e., four modules) in back-to-back relationship near the longitudinal center of the bus, and in FIG. 9 there are shown three such pairings. In FIG. 10, there is shown a pair of modules in back-to-back relationship, but with a substantial space therebetween, both near the longitudinal center of the bus and near the trailing end thereof with all being aligned along lines parallel to the longitudinal centerline of the bus. In addition to those shown, it should be understood that various other installations can be accommodated with the module as described herein.

We claim:

1. A bus air conditioning system with at least one air conditioning module installed on a bus roof having a pair of supply air openings for conducting the flow of conditioned air downwardly near the outer side of the roof and a return air opening whose position is substantially varied in the lateral direction from a longitudinal central axis of the bus for any given installation, comprising:

a refrigeration circuit for circulating refrigerant serially through a compressor, a condenser coil, an expansion valve and an evaporator coil;

an evaporator section including an evaporator blower for causing return air to flow from said return air opening, into a return air compartment of said evaporator section, through said evaporator coil and then to said supply air opening; and a condenser fan for causing outside air to flow over said condenser coil and then to be discharged outside;

wherein said compressor is a horizontally disposed hermetic compressor having a longitudinal axis, the compressor mounted proximate to the roof of the bus and external to the passenger compartment of the bus, the compressor oriented such that the longitudinal axis of the compressor is substantially transverse to the longitudinal axis of the bus.

2. The bus air conditioning system of claim 1 wherein the compressor is a rotary compressor.

3. The bus air conditioner of claim 1 wherein the compressor is a rotary vaned compressor.

4. The bus air conditioner of claim 1 wherein the compressor is a scroll compressor.

5. The bus air conditioning system of claim 1 wherein the compressor is configured to maintain operational lubrication when the longitudinal axis of the bus is inclined from a horizontal position.

6. The bus air conditioning system of claim 1 wherein the compressor is configured to maintain operational lubrication when the longitudinal axis of the bus is inclined more than 10 degrees from a horizontal position.

7. The bus air conditioning system of claim 1 wherein the compressor is configured to maintain operational lubrication when the longitudinal axis of the bus is inclined about 20 degrees from a horizontal position.

8. The bus air conditioning system of claim 1 wherein the refrigeration circuit extends less than about 200 mm above the roofline of the bus.

9. The bus air conditioning system of claim 8, wherein the compressor includes a scroll compressor.

10. The bus air conditioning system of claim 8, wherein the compressor includes a rotary compressor.

11. The bus air conditioning system of claim 8, wherein the compressor includes a rotary vane compressor.

12. The bus air conditioning system of claim 1 wherein the compressor is configured to maintain operational lubrication when the bus is subject to a rolling motion about its longitudinal axis.

13. The bus air conditioning system of claim 12 wherein the rolling motion of the bus is less than about +/−10 degrees.

* * * * *